(12) United States Patent
Sama

(10) Patent No.: US 8,667,280 B2
(45) Date of Patent: Mar. 4, 2014

(54) METHOD AND APPARATUS FOR APPLYING A PARTIAL PASSWORD IN A MULTI-FACTOR AUTHENTICATION SCHEME

(75) Inventor: VenkataBabji Sama, Bangalore (IN)

(73) Assignee: CA, Inc., Islandia, NY (US)

( * ) Notice: Subject to any disclaimer, the term of this patent is extended or adjusted under 35 U.S.C. 154(b) by 180 days.

(21) Appl. No.: 13/010,826

(22) Filed: Jan. 21, 2011

(65) Prior Publication Data

US 2011/0208964 A1 Aug. 25, 2011

Related U.S. Application Data

(60) Provisional application No. 61/307,477, filed on Feb. 24, 2010.

(51) Int. Cl.
*H04L 9/32* (2006.01)

(52) U.S. Cl.
USPC .............................. 713/168; 713/170; 726/20

(58) Field of Classification Search
None
See application file for complete search history.

(56) References Cited

U.S. PATENT DOCUMENTS

| | | | |
|---|---|---|---|
| 8,006,300 B2 * | 8/2011 | Mizrah | 726/20 |
| 2003/0037103 A1 * | 2/2003 | Salmi et al. | 709/203 |
| 2008/0082817 A1 * | 4/2008 | Takahashi et al. | 713/155 |
| 2008/0082821 A1 * | 4/2008 | Pritikin | 713/169 |
| 2008/0189768 A1 * | 8/2008 | Callahan et al. | 726/4 |
| 2009/0138944 A1 * | 5/2009 | Rajasekaran et al. | 726/4 |
| 2009/0327763 A1 * | 12/2009 | Bade et al. | 713/194 |
| 2010/0235901 A1 * | 9/2010 | Simpkins et al. | 726/12 |

FOREIGN PATENT DOCUMENTS

| | | |
|---|---|---|
| EP | 0492692 A2 | 1/1992 |
| EP | 1919123 A1 | 7/2008 |

* cited by examiner

*Primary Examiner* — Andrew L Nalven
*Assistant Examiner* — Mohammed Waliullah
(74) *Attorney, Agent, or Firm* — Quinn Law Group, PLLC

(57) ABSTRACT

A method includes receiving, via a server, a User ID and Password from a client device, and generating a Secret PIN (SPIN). Values for a Partial Password and an encrypted version of the SPIN (ESPIN) are determined. The method includes challenging a user of the client device with a challenge that prompts the user to enter the Partial Password and an ESPIN. An Additional Factor, e.g., a One-Time Password from a Shared Secret, is locked using the SPIN. The Partial Password and challenge unlock the Additional Factor. The method includes authenticating the identity using the unlocked Additional Factor. A system includes a server in communication with a client device, and a non-transitory memory device on which is recorded process instructions for authenticating the identity of a user of the client device. The server executes the instructions to thereby authenticate the identity of the user using the unlocked Additional Factor.

7 Claims, 1 Drawing Sheet

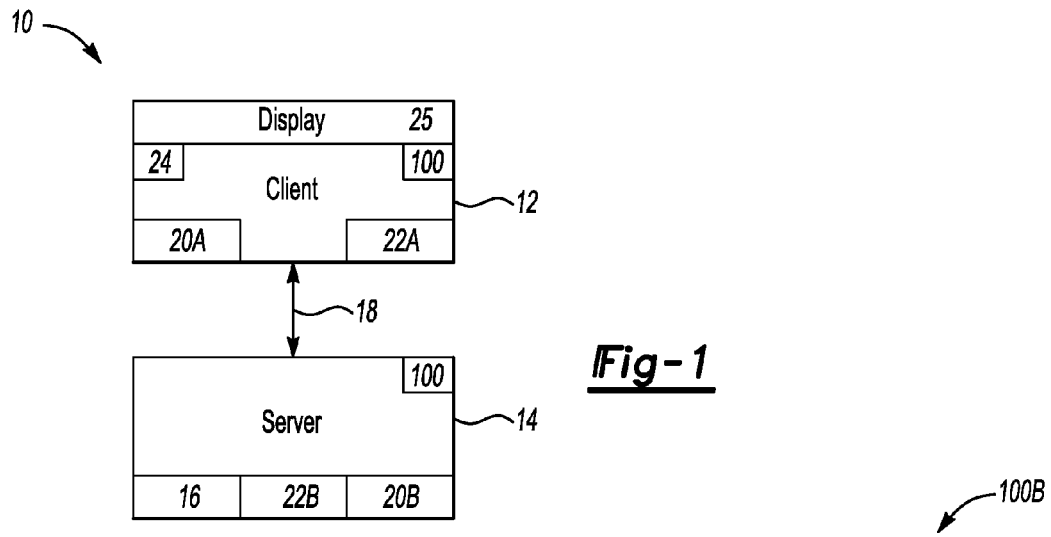
*Fig-1*
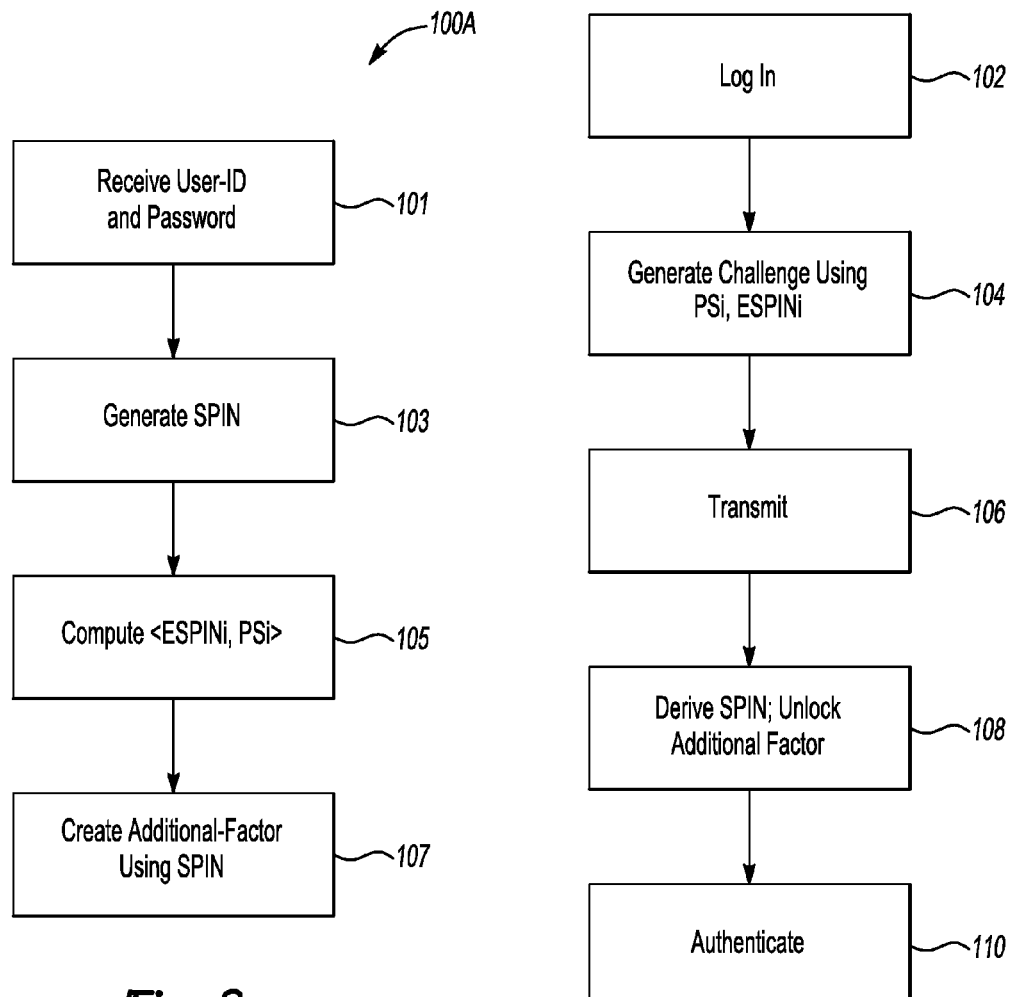
*Fig-2*
*Fig-3*

METHOD AND APPARATUS FOR APPLYING A PARTIAL PASSWORD IN A MULTI-FACTOR AUTHENTICATION SCHEME

CROSS-REFERENCE TO RELATED APPLICATIONS

This application claims the benefit of U.S. Provisional Patent Application No. 61/307,477, filed on Feb. 24, 2010, which is hereby incorporated by reference in its entirety.

TECHNICAL FIELD

The invention relates to a server-based method and apparatus for providing a coordinated user/client device authentication within a multi-factor user identity authentication scheme.

BACKGROUND

A Partial Password authentication technique may be employed to protect a user password from key loggers and/or from direct observation, e.g., "shoulder surfing". In the Partial Password authentication technique, a server may challenge a user of a client device networked with the server with a predetermined set of password character positions. The user responds by entering the corresponding individual characters of a unique user password appearing at the challenged positions. For example, when a user is challenged to identify the characters appearing at positions 1, 3, and 5 of a password "PaSsWorD", the user enters "PSW". The server then verifies the entry against an expected partial password to determine if the response is correct.

Online theft attempts have increased with the ever-expanding use of the internet for conducting business transactions. As a result, password-based authentication security measures alone may provide relatively weak protection. Hardware-based or software-based multi-factor authentication schemes such as a One Time Passcode or Password (OTP) and Public Key Infrastructure (PKI) are becoming increasingly popular. Due to the practical limitations of hardware-based solutions, software-based solutions may be preferred in mass deployment situations.

Such authentication schemes might use the full Password, i.e., a "Known Factor", to lock an Additional Factor such as an OTP-Shared Secret or a Private Key maintained on a disk or other tangible storage media. A client unlocks the Additional Factor and ultimately derives the proof of identity, for example generates the OTP, signs the challenge, etc., thereby completing the required authentication. That is, multi-factor schemes usually require the full Password to be available on the client-side of a given transaction during the authentication process. However, the user still must enter the full Password via the client device, a process which remains vulnerable to the key logging and shoulder surfing techniques noted above.

SUMMARY

A server-based method and system are provided herein that can be used to extend the scope of a Partial Password authentication scheme to a multi-factor authentication scheme. A server-generated secret PIN (SPIN) is used for protecting an Additional Factor, e.g., a Shared Secret used to generate a One-Time Password or a Private Key, which are transmitted to the server as proof of identity during authentication.

The SPIN may be further protected using some aspect of the user's Password. The authentication scheme as set forth herein is designed such that both parties, i.e., the client/user and the server, are required to coordinate with each other in a particular manner to complete the authentication process.

The Additional Factor is locked, for example via encryption, camouflaging, or another suitable locking technique, with the SPIN. The SPIN may be randomly generated by the server. During authentication, the server transmits the SPIN in encrypted form as an ESPIN, for instance encrypted with a Partial Password, along with an optional normal challenge consisting of password character positions required for the Partial Password. The client device then collects the Partial Password from the user, uses the Partial Password in conjunction with the challenge to calculate or derive the SPIN, and then unlocks the Additional Factor.

Subsequently, the unlocked Additional Factor is used to authenticate the user as per the authentication scheme. The server can optionally store the user's Password and SPIN, which may be encrypted in one embodiment, or it can pre-encrypt all possible combinations and reference these preset values. The server can also append a random secret to the SPIN before encrypting it, as set forth hereinbelow, and can require the client to return the appended secret along with the signed challenge in order to provide enhanced security.

In particular, a server-based authentication method for use with a multi-factor authentication scheme includes generating a Secret PIN (SPIN) using a server, and locking an Additional Factor using the SPIN. The method further includes generating an Encrypted Secret PIN (ESPIN) by encrypting the SPIN with a Partial Password. A user of a client device is challenged with the ESPIN and with positions of a Partial Password. The method includes prompting the user for the Partial Password, unlocking the Additional-Factor via the client device using the challenge and Partial Password, and authenticating the identity of a user of the client device using the unlocked Additional Factor.

An authentication system is also provided for use with a multi-factor authentication scheme. The system includes a server in networked communication with a client device, and a tangible, non-transitory memory device on which is recorded process instructions for authenticating the identity of a user of the client device. The server is configured for executing the process instructions to thereby execute the above method.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a server-based system for authenticating a client/user in a multi-factor authentication scheme;

FIG. 2 is a graphical flow chart describing a method for issuing credentials for the system shown in FIG. 1; and FIG. 3 is a graphical flow chart describing a method for authenticating a user using the system shown in FIG. 1.

DETAILED DESCRIPTION

Referring to the drawings, a server-based authentication system 10 is shown in FIG. 1 that is configured for use in a multi-factor authentication scheme. The system 10 includes a host machine or server 14 in networked communication with a client device 12. The server 14 hosts a secure website 16 or other secure application. The client device 12 and the server 14 communicate with each other over a network connection 18 such as the internet, a wide area network (WAN), or a local area network (LAN).

The client device 12 and the server 14 each have respective memory 20A, 20B and a respective central processing unit (CPU) 22A, 22B. The server 14 includes process instructions or code suitable for executing the present method 100, which is explained below in two parts as method 100A (FIG. 2) and method 100B (FIG. 3). The method 100 authenticates a user of the client device 12 without requiring entry of a full password other than at issuance, as noted below.

The memory 20A, 20B is tangible/non-transitory. For instance, the memory 20A, 20B may be any computer-readable medium that participates in providing computer-readable data or process instructions. Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory 20A, 20B may also include a floppy disk, a flexible disk, hard disk, magnetic tape, any other magnetic medium, a CD-ROM, DVD, any other optical medium, etc.

Still referring to FIG. 1, the client device 12 and the server 14 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms resident in the client device 12 and the server 14 or accessible thereby may be stored via memory 20A, 20B and automatically executed by the CPUs 22A and/or 22B to provide the respective functionality.

Communication is established between the client device 12 and the server 14 over the network connection 18 when a user attempts to login to the website 16, e.g., by entering a predetermined Uniform Resource Locator (URL) into a web browser 24. Access to the website 16 is not limited to the web browser 24, or even necessarily initiated by the client device 12. For example, a Windows Login scenario may be present, and/or the server 14 may request authentication from the client device 12 in the middle of an existing web session.

Upon occurrence of this event, an authentication dialogue takes place, possibly including displaying information to a user via a display 25. The authentication scheme is designed such that both parties, i.e., the client device 12 and the server 14, are required to coordinate to complete the authentication process.

Issuance

Referring to FIG. 2, the process of initial issuance of the SPIN and an ESPIN is described in further detail as method portion 100A. At step 101, the server 14 of FIG. 1 may receive a User ID and a full Password from the user of the client device 12. This information may be temporarily recorded in memory 20B of the server 14.

At step 103, the server 14 automatically generates the SPIN. Once the SPIN has been generated, the method portion 100A proceeds to step 105.

At step 105, the server 14 of FIG. 1 computes, for each partial position set ($PS_i$) in a user's full password, the values for sets ($PPWD_i$) and ($ESPIN_i$), wherein ($PPWD_i$)=a Partial-Password (Password, $PS_i$), ($ESPIN_i$)=Encrypted (SPIN, $PPWD_i$), and (i)=the number of variations in a number of challenged password positions (r). This step therefore may entail encrypting the SPIN generated at step 103. These values may be stored in memory 20B of the server 14, or at a suitable location that is readily accessible by the server 14.

At step 107, the server 14 creates or accesses an Additional Factor, and then locks the Additional Factor using the SPIN. The locked Additional Factor is then transmitted via the network connection 18 to the client device 12.

The number of ESPINs for a given user password is combinatorial, i.e., $\Sigma_i({}^n C_r)$, with respect to the size (n) of the user's password, the number of positions (r) to be selected, and the number of variations (i) in the number of positions to be challenged. The server 14 can optionally pre-compute all of the ESPINs in one embodiment, in which case the password and SPIN need not be stored on the server 14. Alternatively, the server 14 can chose to store the Password and the SPIN in a protected manner. In such a case, the server 14 can compute the ESPIN during the authentication process.

Authentication

Referring to FIG. 3, and with reference to the various system elements shown in FIG. 1 and described above, the authentication method portion 100B begins at step 102, wherein a user of the client device 12 begins to log in to the server 14. For example, step 102 may entail the user entering a User-ID using the web browser 24. The method portion 100B then proceeds to step 104.

At step 104, the server 14 randomly selects the $ESPIN_i$. This $ESPIN_i$ may be protected by the Partial Password corresponding to the Position Set ($PS_i$), with the value of the Position Set ($PS_i$) referring only to the challenged positions. The server 14 selects a Partial Password Challenge, ($PPC_i$)=<$ESPIN_i$, $PS_i$> as described above for the user, such that the value of (i) is repeated if the earlier authentication attempt was unsuccessful. Otherwise, the server 14 may chose (i) randomly. The server 14 may optionally respond with a conventional challenge along with the Partial Password Challenge ($PPC_i$) if the authentication scheme so requires.

After step 104, the server 14 proceeds to step 106 and transmits the challenge as described above to the client device 12, and then proceeds to step 108.

At step 108, the client device 12 collects the Partial Password ($PPWD_i$) from the user, uses the Partial Password in conjunction with the challenge to compute or derive the SPIN, and unlocks the Additional Factor. That is, the client device 12 receives the Partial Password ($PPWD_i$) from the user using the positions as specific in the Position Set ($PS_i$), and computes the SPIN as: SPIN=Decrypt ($ESPIN_i$, $PPWD_i$). Once the Additional Factor is unlocked, the server 14 can derive the proof of identity needed to authenticate the identity of the user, e.g., by generating the OTP, signing the challenge, etc. The method portion 100B then proceeds to step 110.

At step 110, the server 14 of FIG. 1 verifies the proof of identity to authenticate the user of the client device 12. Upon successful authentication, the user is free to access the website 16 or any other protected application. The method portion 100B is finished.

The selection of the Partial Password Challenge ($PPC_i$) avoids exposing all existing password positions. The server 14 instead can remember the last challenged positions, and then decide whether or not to repeat the set based on the last authentication status. The Partial Password challenge ($PPC_i$) may be repeated as long as the last authentication attempt is either unsuccessful or incomplete. Otherwise, one may end up exposing all possible position combinations, and hence knowing a partial set is sufficient to succeed the authentication by repeating the challenge request until the known Partial Password is challenged. A random challenge among the available challenges may be selected if the last authentication is successful. This strategy may help to increase the probability of an end user being aware of the full password. The User ID is required as part of the challenge request for look up of the user record.

Further Optimization of the Authentication Scheme

The authentication scheme as set forth above in FIGS. 2 and 3 can further be hardened or optimized by enhancing the challenge-response protocol. In the scheme as described above, the number of Encrypted SPINs (ESPINs) is limited, and there is no fool proof evidence that the user used the Partial Password (PPWD$_i$) in response to the challenge: PPC$_i$=<ESPIN$_i$, PS$_i$>. The strength of the criteria of selecting the Partial Password Challenge (PPC$_i$) as explained above increases with the number of ESPINs. Therefore, the number of ESPINs may be increased.

This may be achieved by introducing an additional random secret (AS$_r$) in the Partial Password Challenge (PPC$_i$), which can be derived by the client device 12 only by using the corresponding Partial Password (PPWD$_i$). The server 14 would expect the random secret (AS$_r$) in the response from the client device 12, which ensures that the client device 12 uses the appropriate Partial-Password (PPWD$_i$) during the transaction.

For this purpose one may modify the ESPIN computation described above to embed a random secret (AS$_r$) in it. For every Position Set (PS$_i$), the server 14 may compute a multiple (r=0 . . . k) of ESPINs, hereinafter referred to as ESPIN$_{i,r}$, by combining the random secret (AS$_r$) with the SPIN as:

$$ESPIN_{i,r}=Encrypt(SPIN+AS_r, PPWD_i)$$

Accordingly, the challenge is: PPC$_i$=<ESPIN$_{i,r}$, PS$_i$>. Now the client device 12 is unaware of the number of positions to be selected, i.e., (r), as there are multiple ESPIN$_{i,r}$ for every Position Set (PS$_i$), though the Position Set (PS$_i$) is unencrypted. As the server 14 expects the random secret (AS$_r$) in the authentication request along with normal challenge-response, the client device 12 is forced to use the appropriate Partial Password (PPWD$_i$) in the transaction to extract the random secret (AS$_r$).

While the best modes for carrying out the invention have been described in detail, those familiar with the art to which this invention relates will recognize various alternative designs and embodiments for practicing the invention within the scope of the appended claims.

The invention claimed is:

1. A server-based authentication method for use with a multi-factor authentication scheme, the method comprising:
   storing, via a server, a user ID and a full Password of a user;
   establishing a network connection between the server and a client device after storing the user ID and full Password;
   receiving only the user ID, via the server, from the client device over the established network connection;
   randomly generating a Secret PIN (SPIN) via the server;
   determining, via the server, each partial password contained in the full Password;
   computing a set of encrypted SPINs (ESPINs), including encrypting the SPIN with each of the Partial Passwords;
   locking an Additional Factor using the SPIN, including encrypting a private key with the SPIN;
   challenging a user of the client device, via the established network connection, with corresponding positions of individual characters of a randomly selected one of the Partial Passwords and a corresponding ESPIN for the randomly selected Partial Password, including prompting the user to enter the corresponding characters of the randomly selected Partial Password via the client device;
   computing the SPIN from the ESPIN, via the client device, in response to a correct entry of the individual characters of the Partial Password;
   unlocking the private key via the client device using the computed SPIN; and
   authenticating the identity of the user of the client device via the server using the unlocked private key.

2. The method of claim 1, further comprising:
   determining if an earlier authentication attempt between the client device and the server was unsuccessful; and
   repeating the challenge if an earlier authentication attempt was unsuccessful.

3. The method of claim 2, further comprising:
   randomly choosing a number of variations in a number of the positions in the Partial Password if the earlier authentication attempt was successful.

4. A server-based authentication method for use with a multi-factor authentication scheme, the method comprising:
   receiving the User ID over an established network connection between a server and a client device;
   randomly generating a secret PIN (SPIN) via the server in response to receiving the User ID;
   computing, via the server, all possible Partial Passwords from a full Password of a user of the client device, and also computing a set of encrypted SPINs (ESPINs), including separately encrypting the SPIN with each of the possible Partial Passwords;
   storing all computed ESPINs in memory of the server;
   locking an Additional Factor using only the SPIN;
   challenging the user with one of the ESPINs and with the corresponding positions of the Partial Password encrypted in the ESPIN over the network connection;
   receiving, from the client device, an unlocked Additional Factor in response to challenging the user; and
   authenticating the user using the unlocked Additional Factor.

5. The method of claim 4, wherein the Additional Factor is a private key.

6. The method of claim 4, further comprising removing the full Password from the server after storing all computed ESPINs.

7. A system comprising:
   a processor; and
   memory on which is recorded instructions for authenticating a user of a client device;
   wherein the processor is configured to execute the instructions from the memory and thereby cause the processor to:
      establish a network connection with the client device;
      randomly generate a Secret PIN (SPIN) in response to receipt of a userID from the client device;
      determine each partial password contained in the full Password;
      compute a set of encrypted SPINS (ESPINs), including encrypting the SPIN with each of the Partial Passwords;
      lock an Additional Factor using the SPIN, including encrypting a private key with the SPIN;
      challenge the user of the client device, via the established network connection, with corresponding positions of individual characters of a randomly selected one of the Partial Passwords and a corresponding ESPIN for the randomly selected Partial Password, including prompting the user to enter the corresponding characters of the randomly selected Partial Password via the client device;
receive the private key from the client device in response to a correct entry of the individual characters of the Partial Password by the user; and
authenticate the identity of the user of the client device using the unlocked private key.

\* \* \* \* \*